(12) United States Patent
Marmet

(10) Patent No.: US 11,415,702 B2
(45) Date of Patent: Aug. 16, 2022

(54) DEVICE AND METHOD TO DETECT SPOOFING OF A TERMINAL

(71) Applicant: CENTRE NATIONAL D'ETUDES SPATIALES, Paris (FR)

(72) Inventor: François-Xavier Marmet, Muret (FR)

(73) Assignee: CENTRE NATIONAL D'ETUDES SPATIALES (CNES), Paris (FR)

( * ) Notice: Subject to any disclaimer, the term of this patent is extended or adjusted under 35 U.S.C. 154(b) by 3 days.

(21) Appl. No.: 16/769,572

(22) PCT Filed: Nov. 23, 2018

(86) PCT No.: PCT/EP2018/082414
§ 371 (c)(1),
(2) Date: Jun. 3, 2020

(87) PCT Pub. No.: WO2019/110331
PCT Pub. Date: Jun. 13, 2019

(65) Prior Publication Data
US 2020/0371246 A1  Nov. 26, 2020

(30) Foreign Application Priority Data
Dec. 8, 2017 (EP) ..................................... 17306726

(51) Int. Cl.
*G01S 19/21* (2010.01)
*G01S 5/00* (2006.01)
(Continued)

(52) U.S. Cl.
CPC .......... *G01S 19/215* (2013.01); *G01S 5/0009* (2013.01); *G06K 19/06009* (2013.01); *H04W 12/041* (2021.01)

(58) Field of Classification Search
CPC ..................................................... G01S 19/215
See application file for complete search history.

(56) References Cited

U.S. PATENT DOCUMENTS 8,368,594 B2 * 2/2013 Khan ....................... G01S 19/14
342/386
8,590,057 B1 * 11/2013 Mayblum ............. H04L 63/062
726/28
(Continued)

FOREIGN PATENT DOCUMENTS

| EP | 3 104 124 A1 | 12/2016 | |
| WO | WO-9731437 A1 * | 8/1997 | ............. H04B 11/00 |
| WO | 2017/188813 A1 | 11/2017 | |

*Primary Examiner* — Cassi J Galt
(74) *Attorney, Agent, or Firm* — Burris Law, PLLC

(57) ABSTRACT

A terminal to calculate a position and detect spoofing, the terminal includes a receiver of first signals, notably signals of a GNSS type, from first sources, to compute a first information relative to its position, as for instance a pseudo range measurement, an ephemeris, a navigation message, spatial coordinates or temporal coordinates, and to calculate a position; a receiver of a second signal of a non-RF and non-GNSS type from a second source, notably from an optical display, the second signal comprising a second information transmitted using a predetermined encoding format to retrieve said second information; a processing logic configured to detect spoofing by comparing the first and second information. The associated transmitters, authentication server and spoofing detection methods are also provided.

17 Claims, 8 Drawing Sheets

(51) Int. Cl.
*G06K 19/06* (2006.01)
*H04W 12/04* (2021.01)
*H04W 12/041* (2021.01)

(56) References Cited

U.S. PATENT DOCUMENTS

| | | | |
|---|---|---|---|
| 9,876,529 B2 * | 1/2018 | Turner | ............... H04B 7/18523 |
| 2010/0134352 A1 | 6/2010 | Thomson et al. | |
| 2016/0370471 A1 | 12/2016 | Mabuchi et al. | |
| 2017/0090036 A1 | 3/2017 | Zalewski et al. | |

\* cited by examiner

DEVICE AND METHOD TO DETECT SPOOFING OF A TERMINAL

CROSS-REFERENCE TO RELATED APPLICATIONS

This application is a National Stage of International patent application PCT/EP2018/082414, filed on Nov. 23, 2018, which claims priority to foreign European patent application No. EP 17306726.5, filed on Dec. 8, 2017, the disclosures of which are incorporated by reference in their entirety.

FIELD OF THE INVENTION

The present invention relates generally to the field of positioning techniques. More particularly, it describes a receiver and associated method to detect spoofing and discrepancies in a receiver computing a position, notably when this receiver is a GNSS (acronym for Global Navigation Satellite System) receiver.

BACKGROUND PRIOR ART

Applications based on positioning information are taking an increasing place in today's society. These include Location Based Services (LBS), which intend to provide to some user a content that is relevant to its position, like augmented reality applications, navigation systems, and many others. This trend is expected to further increase with the emerging markets of autonomous vehicles (cars, trucks, boats, . . . ), and secure transactions. Among the existing positioning techniques, GNSS-based techniques have proven to be the best candidates outdoor, because they provide high accuracy with a worldwide coverage. For indoor applications, many technologies are available, as for instance Wi-Fi triangulation (notably WIFISLAM™), GPS coordinates combined with information retrieved from various sensors like a compass, gyroscope, pedometer and/or accelerometer, or positioning information provided by Bluetooth, Wi-Fi or VLC (Visible Light Communication) beacons. However, indoor positioning techniques provide a lower accuracy than GNSS positioning techniques.

GNSS positioning techniques have been used and improved for many years now. Two Global Navigation Satellite Systems (GNSS) have been fully deployed for a number of years (the US Global Positioning System (GPS) and the Russian GLONASS) and two more are under deployment (the Chinese Beidou Navigation Satellite System and the European Galileo™ system).

The way GNSS systems operate is the following: a fleet of satellites, embedding high precision atomic clocks, transmit at specific times signals made of a navigation message modulated by a pseudo random sequence, further modulated and shifted to a carrier frequency. The various signals are transmitted on the same carrier frequency but use different pseudo random sequences. The navigation message comprises information like the transmission time of the message, and information about the position of the various satellites, called ephemeris. On the receiver side, the signals are separated based on their pseudo random code. From the reception time of the signals and the transmission time retrieved from the navigation message, the receiver can calculate an information called pseudo-range, which is representative of a distance between the receiver and the associated satellite. When a receiver has calculated at least four pseudo ranges, it can solve position equations that comprise four unknown variables: latitude, longitude, altitude and time. The solution of these equations is known as a Position, Velocity and Time (PVT) estimate.

However, GNSS receivers are vulnerable to signal spoofing attacks. Indeed, in current civilian GNSS applications, positioning information is not protected and there is a general lack of authentication information. In commercial or military applications, the positioning signals might be protected using specific or time varying pseudo random codes but this protection is limited and can easily be circumvented. Thus, spoofing can be a major safety issue, in particular with regard to autonomous vehicles, and the development of countermeasures to deal with spoofing is a major challenge for deployment of future reliable GNSS-based applications.

There are many ways to spoof GNSS positioning signals using a ground transmitter. Due to the proximity with the receiver, spoofing signals transmitted from terrestrial transmitters are received by GNSS receivers with higher power level than legitimate signals transmitted from the satellites, and generally overshadow these signals.

A first way to spoof a positioning signal is to use a terrestrial transmitter to record, delay and replay legitimate GNSS signals. This technique is known as "meaconing". Due to the fact that the received signal is delayed and does not come directly from a legitimate satellite, the position and time calculated by the victim receiver are distorted.

Another way to spoof is to generate a complete fake GNSS signal, in order to transmit false and misleading navigation signals that will be interpreted by the receiver as legitimate information and lead to a wrong positioning of the victim receiver.

Another way is to transmit spoofing signals that are synchronized with the authentic GNSS signal, and to slightly alter the information contained in the navigation message to progressively drift the PVT computation. This method of spoofing is one of the most difficult to detect as the transition of the receiver from the legitimate signals to the spoofing signals is made slowly and gradually.

Likewise, indoor positioning techniques based on the transmission of a specific positioning signal can be easily spoofed by transmitting a spoofing signal with a higher power level.

Another type of spoofing consists in modifying a receiver in a way that it calculates a position that is different from its actual position. This type of spoofing is not performed by substituting a legitimate RF signal but by a software manipulation of the raw data used by the PVT computation engine, by a software manipulation, performed over the PVT that output of the receiver, at the API (Application programming interface) level, or even at the software and/or OS (operating system) level. For example, the pseudo ranges to GNSS satellites calculated by a smartphone can be modified so that the PVT calculation leads to a predetermined result. Alternately, the content of the NMEA sentences (acronym for National Marine Electronics Association), that contain position and time information, may be altered to match a predetermined result. This type of spoofing is an issue when the position of the receiver is used to authenticate a transaction. For example, software spoofing applications have become particularly widespread when the PokémonGo™ game was released: users where able to catch Pokémons all around the world without leaving their house. What can be seen as anecdotal when applied to a game can have more severe repercussions when dealing with authenticating a transaction like a package delivery or a banking payment.

To some extent, jamming may also be considered as some type of spoofing attack. Indeed, it may be used to block the GNSS signal reception and disable the position measurement. For example, when a receiver that has acquired a first position (which may have been spoofed) faces jamming, it may be unable to process the GNSS signals. At the software level, this situation may be interpreted as a "non-moving" receiver i.e. having fixed position. Some examples are known for trucks and delivery services which routes were altered with this approach while avoiding detection at the receiver level. Although GNSS jamming is not legal in most countries, equipments are commercially available.

Many techniques are known to detect spoofing of GNSS signals. Most of them are based on detection of sudden AGC variations of the received signals, on detection of multiple synchronization peaks, or on detection of correlators' outputs distortions. However, these techniques are not reliable when the receiver evolves in urban propagation environments, where the signal is prone to suffer from multipath reflections and sudden and temporary masking.

Although spoofing attacks can also be, to a certain extent, mitigated by adding cryptographic authentication to the navigation signals and/or navigation messages, the cost for deploying an encrypted satellite signal can be high and encryption does not protect from meaconing, i.e. recording, delaying and retransmitting legitimate GNSS signals.

To detect software circumvention done to a receiver in order to spoof its position, the coherency of the position over time can be evaluated: when the receiver goes from Paris to London in a few seconds, probability of spoofing is high. However, it is more difficult when spoofing is performed at a slow and regular speed (with regard to the application considered).

Therefore, spoofing and jamming of GNSS signals create in particular a risk for location-based services. GNSS is used as a sensor for many safety-critical applications and is a crucial sensor for timing and synchronization of reference stations for telecommunications, electrical power supplies, exchange markets and banks. There is consequently a need for a solution to confirm the existence or absence of spoofing in a receiver, in order to control the risk incurred when using a position/time information provided by a receiver. Notably, there is a need that the solution provided is simple enough to be deployed on a large scale at limited extra costs.

SUMMARY OF THE INVENTION

It is an object of the invention to provide improvements over the prior art by implementing a two-factors validation of a positioning signal. To this end, the invention discloses a terminal to calculate a position and detect spoofing. The terminal according to the invention comprises a receiver of first signals of a GNSS type received from first sources, configured to compute one or more first information relative to a position of the terminal, the first information being one or more of a pseudo range measurement, an ephemeris, a navigation message, spatial coordinates or temporal coordinates, and to calculate a position. It further comprises a receiver of a second signal of a non-GNSS type received from a second source external to the terminal, the second signal comprising a second information relative to a position transmitted using a predetermined encoding format, configured to retrieve said second information. Finally, the terminal comprises a processing logic configured to detect spoofing based on a comparison between the first information and the second information.

According to one advantageous embodiment of the invention, the second signal is an optical signal transmitting the second information as a machine-readable optical label.

According to another embodiment, the second signal is an optical signal using Visible Light Communication.

According to another embodiment, the second signal is a short range RF signal, advantageously selected from a set of technologies comprising RFID communications, Bluetooth™, Zigbee™ and Wi-Fi.

According to still another embodiment, the second signal is an acoustic signal.

The invention further concerns a terminal, to calculate a position and detect spoofing, comprising a receiver of one or more first signals received from one or more first sources, configured to compute or retrieve one or more first information relative to a position of the terminal from said first signals, the first information being one or more of a pseudo range measurement, spatial coordinates or temporal coordinates, and to calculate a position. The terminal further comprises a receiver of a second signal displayed as a machine-readable optical label by a second source external to the terminal, the second signal comprising a second information relative to a position transmitted using a predetermined encoding format, configured to retrieve said second information. The terminal further comprises a processing logic configured to detect spoofing based on a comparison between the first information and the second information.

According to one embodiment, spoofing is detected when a difference between the first information and the second information is above a threshold, which may be adaptive.

Advantageously, the second signal may further comprise an authentication key, the terminal being further configured to use the authentication key to retrieve the second information.

In another embodiment, the one or more second signals are encrypted, the terminal being further configured to decrypt the second information.

According to an embodiment of a terminal according to the invention, the second information is related to a position of an equipment from which it is transmitted.

The invention also covers a transmitter, configured for transmitting a signal of a non-GNSS type carrying an information being one or more of a pseudo range measurement, an ephemeris, a navigation message, spatial coordinates or temporal coordinates, where the information is transmitted in an encoding format previously made available to a set of terminals and where the information is adapted to be compared to another positioning information by a terminal in the set of terminals, advantageously through the display of a machine-readable optical label.

In an advantageous embodiment, the information transmitted is time varying. The transmitter may also be associated to an authentication key, and be further configured to transmit the information using an encoding format relying on said authentication key, and/or to encrypt said information.

In addition, the invention concerns a server comprising an access to a database of:
  registered transmitters as of any of the previously presented embodiments;
  registered terminals as of any of the previously presented embodiments;
and further comprising one or more communication links configured to transmit to the registered transmitters and the registered terminals one or more encoding formats to be applied to the non-GNSS signals.

Advantageously, the server may be configured to generate authentication keys associated to the registered transmitters of the database.

The invention may involve a method of calculating a position and detecting spoofing in a terminal, which comprises the steps of:
- receiving first signals of a GNSS type from first sources, to compute one or more first information relative to a position of the terminal, the first information being one or more of a pseudo range measurement, an ephemeris, a navigation message, spatial coordinates or temporal coordinates, and calculating a position;
- receiving a second signal of a non-GNSS type from a second source outside the terminal, the second signal comprising one or more second information transmitted using a predetermined encoding format, to retrieve said second information;
- detecting spoofing by comparing the first information and the second information.

It also comprises a method of calculating a position and detecting spoofing in a terminal, which comprises the steps of:
- receiving one or more first signals from one or more first sources, to compute or retrieve one or more first information relative to a position of the terminal, the first information being one or more of a pseudo range measurement, spatial coordinates or temporal coordinates, and calculating a position;
- receiving a second signal displayed as a machine-readable optical label by a second source outside the terminal, the second signal comprising a second information transmitted using a predetermined encoding format, and retrieving said second information;
- detecting spoofing based on a comparison between the first information and the second information.

BRIEF DESCRIPTION OF THE DRAWINGS

The invention will be better understood and its various features and advantages will emerge from the following description of a number of exemplary embodiments and its appended figures in which.

Figure 1:
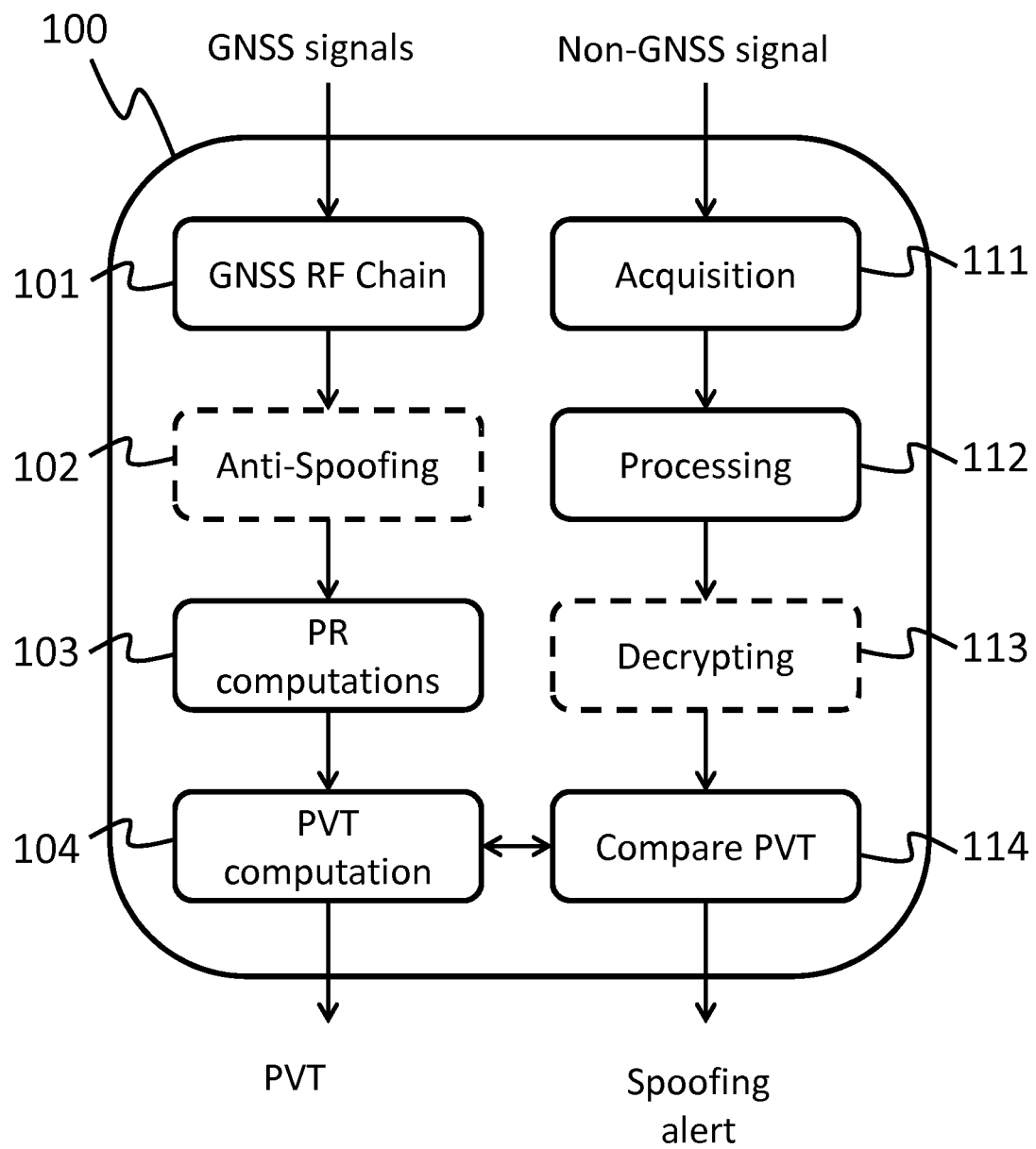
FIG. 1 describes an embodiment of the invention wherein spoofing detection is performed on a GNSS receiver at the PVT level.

The examples disclosed in this specification are only illustrative of some embodiments of the invention. The invention in its broader aspects is therefore not limited to the specific details, representative methods, and illustrative examples shown and described.

DETAILED DESCRIPTION OF THE INVENTION

In what follows, unless indicated otherwise, when it comes to a GNSS receiver, what is called "positioning information" is the set of information required to determine a PVT computation, meaning spatial coordinates (latitude, longitude, and altitude), and temporal coordinates (time information). When it comes to another positioning technique, the positioning information may be limited to spatial coordinates transmitted to the receiver, associated or not with a time information.

The invention concerns a method and associated equipments to detect spoofing in a receiver, based on the consideration of two data links providing information about a position of the receiver. The first data link gives accurate positioning information, while the second data link provides positioning information whose accuracy depends on the choice and configuration of the data link and expected performances of the anti-spoofing technique. The two position datasets are compared to determine whether or not the receiver might suffer spoofing.

To determine the occurrence of spoofing, the invention is based on:
- calculating an intermediate or final positioning information from signals dedicated to this end, like for instance GNSS signals,
- retrieving a corresponding information from another data link, and
- comparing the two pieces of information to determine if the receiver is likely to be spoofed or not.

Thus, an attacker willing to spoof a positioning system would have to spoof both the positioning system and the alternate data link to achieve his goals, increasing thus dramatically the complexity of the spoofing.

The second positioning information is not required to have a high accuracy, as it is not to be used to determine a position of the receiver, but to support a validity of the first measurement. Thus, to some extent, its transmission does not require using high accuracy transmission equipment, latency constrained data links, and complex reception chains, and can be implemented at a low cost.

In what follows, the invention will be described focusing on two exemplary embodiments. Each of the exemplary embodiment shows specific advantages and benefits:
- in the first implementation example, the first data link is a GNSS data link, providing an accurate positioning information. This data link is privileged as it is very accurate outdoor and is prone to suffer spoofing, but can hardly be considered for indoor positioning. This implementation is recommended for outdoor applications, like for instance self-driving vehicles;
- in the second implementation example, the second data link is providing the second positioning information through the display of a machine-readable optical label, as for instance a QR-code. Indeed, displaying a QR-code is low cost, short range, can be made non invasive using invisible light, and is quite robust to spoofing due to its directivity and its limited propagation range. The data link providing the first positioning information can be any type of data link, which makes this implementation recommended for indoor applications.

Each of those two exemplary can be declined in several embodiments, and can be combined, using GNSS positioning along with QR-code display for instance.

FIG. 1 describes an embodiment of the first implementation example of the invention, wherein the positioning information is calculated on GNSS positioning signals. In this embodiment, the spoofing detection is performed at the PVT level, the positioning information considered for comparison being spatial coordinates and/or temporal coordinates. Modules represented in dotted line are optional.

The receiver 100 according to this embodiment of the invention comprises a first receiving chain (101, 102, 103, 104) to receive and process GNSS signals. This receiving chain first filters, down-converts and digitizes the GNSS signals through a GNSS RF chain 101. An optional anti-spoofing processing 102 can be performed over the digitized signals, as well as any other signal processing treatment, as for instance multipath mitigation, jammers rejection, or any other relevant processing. Then, the received signals are processed (103), to demodulate, and when relevant decrypt, a navigation message, and track each of the GNSS signals in order to retrieve raw data, like for instance pseudo ranges (a pseudo range being an estimated range between a specific satellite and the receiver), Doppler shift estimate or any other relevant information. Then, when at least four pseudo ranges are retrieved, a PVT solution is determined (104), meaning that spatial coordinates (latitude, longitude and altitude) and temporal coordinates (timing information) of the receiver are calculated.

Operations performed in modules 101 to 104 are classical processing of GNSS receivers.

The receiver according to this embodiment of the invention further comprises a second receiving chain (111, 112, 113, 114), configured to receive positioning information from non-GNSS signals. These non-GNSS signals may be, but are not limited to, RF (Radio Frequency) signals or optical signals, a camera configured to capture an optical message carrying an information about a position being one possible embodiment of this second receiving chain. The non-GNSS signal is acquired (111) and processed (112) depending on the nature of the data link used for the transmission.

In this embodiment, the information transmitted within the non-GNSS signal are spatial and/or temporal coordinates, transmitted using for example ECEF coordinates (acronym for Earth Centered-Earth Fixed).

The receiver is further configured to compare (114) the spatial and/or temporal coordinates computed from the GNSS signals during the PVT computation with those carried by the non-GNSS signal. Any discrepancy shall be considered as a possible spoofing situation.

The two positioning information are not expected to be strictly identical, as the non-GNSS position does not generally have the same accuracy as the GNSS position. Indeed, the transmitter in charge of emitting the non-GNSS signal does not know the exact position of the receiver and the propagation time required to reach it, and can only transmit information about its own position or the position of an area in which the receiver might be positioned, knowing the expected range and directivity of the non-GNSS transmission. In addition, the non-GNSS transmitter is not required to have a high accuracy. However, the GNSS measurements and the information transmitted using the non-GNSS signals are expected to be in a similar range. The difference between these two positioning information may be compared to a threshold that is set depending on a plurality of parameters. Among these parameters are the expected range of the non-GNSS transmitter, its accuracy, as well as the criticality of the spoofing detection, and others. For instance, the threshold value (spatial threshold/time threshold) could be set at 100 m/0.1 sec for critical applications, and 500 m/1 minute for mass market applications. The value of the threshold may also be adapted depending on various parameters as for example the characteristics of the environment or the time elapsed since the last GNSS signal acquisition. For instance, to detect spoofing in a receiver embedded in a road vehicle, the spatial positioning threshold may be set to 100 m, and reduced to 50 m or even less in dense urban environments, or when the density of transmitters of the non-GNSS signal is high, i.e. when they are close one to each other. The threshold may also be adapted depending on the type of use. For instance, a truck used for critical goods transportation may use a constraining threshold when loaded with goods, and a softer one when empty. The threshold value should therefore be chosen depending on the usage, expected probability of detection, probability of false alarms and probability of wrong detection.

When one or more of the differences between the GNSS and non-GNSS positioning measurements (over spatial and/or temporal coordinates) are above the threshold, the GNSS positioning information is declared invalid. A specific action may also be triggered, as for example, displaying a spoofing flag or an alarm, denying a position authenticity check, requesting a confirmation measurement, or any other relevant action. Multiple flag levels can be defined, depending on the value of the difference, and/or a frequency of spoofing detection. Some alerts may also be sent to the GNSS receiver, so that the GNSS algorithms take into account the presence of spoofing for further processing of the GNSS signals. For instance, the parameters of anti-spoofing algorithms 102 may be modified to provide more robustness, or PVT measurements may be computed from various combinations of pseudo ranges until they fit the comparison with the non-GNSS positioning information, in order to detect which GNSS signals are spoofed. Indeed, in some cases, only a limited number of satellite signals may be spoofed, and rejecting these signals when performing the PVT computation may be a good countermeasure.

Obviously, the quality of the spoofing detection depends on the precision of the non-GNSS positioning information, the range of the non-GNSS transmission, and the value of the threshold, but also on the number of pieces of information that are compared. A spoofing detection comparing temporal coordinates only will be less efficient than a spoofing detection comparing spatial coordinates (meaning three positioning information), which will be less efficient than a spoofing detection comparing both spatial and temporal information. In addition, transmitting time-varying information, as temporal coordinates or ephemeris, further improves the robustness against spoofing.

In order to further improve the robustness of the spoofing detection method embedded in a receiver according to the invention, the positioning information that is transmitted through the non-GNSS link may be encrypted. This encryption severely increases the complexity for an attacker to generate fake non-GNSS signals, and spoof both the GNSS and non-GNSS signals. Thus, the service provided by the invention can easily be restricted to a limited set of users with a low implementation cost, contrary to encryption of GNSS signals, which requires dedicating expensive satellite resources to a limited set of users. To this end, the non-GNSS position information may be encrypted using keys shared within a limited set of receivers. The encryption may be symmetric or asymmetric. The receiver according to this embodiment is therefore configured to decrypt (113) the non-GNSS positioning information.

A mechanism to authenticate transmitters may also be implemented. To this end, non-GNSS transmitters can associate an authentication key along with the positioning information. Thus, non-GNSS positioning information provided by transmitters that are unknown to the receiver may be rejected. In another embodiment, the authentication key can be associated to a predetermined coding, interleaving or encryption data format applied to the useful information transmitted in the non-GNSS signals, thus further improving the robustness to spoofing.

The invention consequently provides a protection over spoofing with a very limited number of modifications to existing GNSS receivers. Indeed, its implementation may be achieved merely by adding an extra chain for receiving a secondary non-GNSS positioning information, and performing a comparison between both GNSS and non-GNSS positioning information. The comparison over one or both of the spatial and temporal coordinates may be implemented using the computation resources of the GNSS receivers as its cost is very low. Concerning the additional non-GNSS reception chain, depending on the embodiment of the receiver, in order to further reduce the implementation cost, it can be achieved using hardware/software modules already available in most already existing GNSS receivers, as will be described hereafter.

Figure 2:
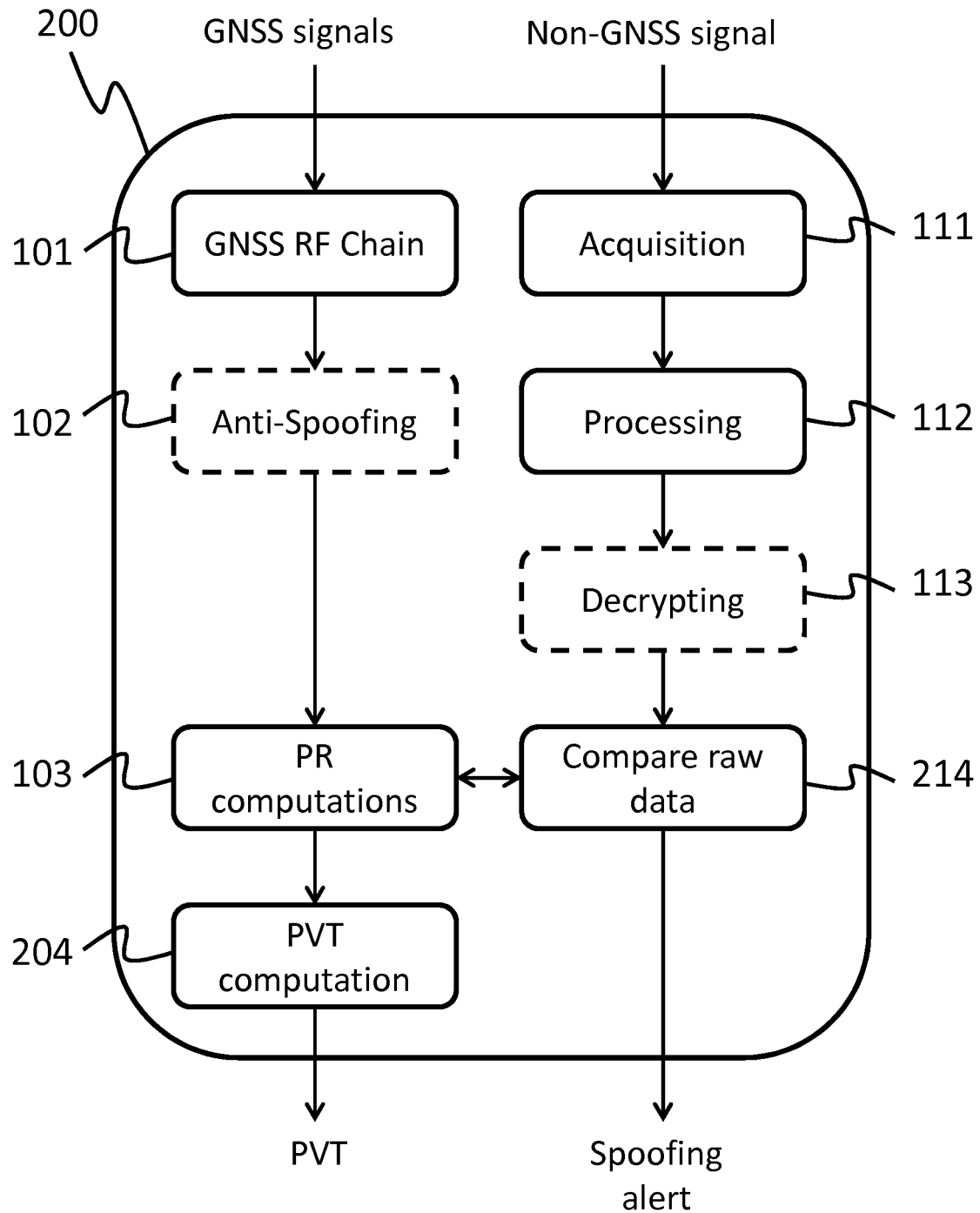
FIG. 2 describes an embodiment of the invention wherein spoofing detection is performed on a GNSS receiver at raw data level.

Still focusing on the first implementation example of the invention, FIG. 2 describes a GNSS receiver 200 according to another embodiment of the invention.

In this embodiment, the information measured from the GNSS signals and retrieved from the non-GNSS signals to be compared are raw data, as for instance pseudo ranges or all or part of navigation messages.

When this information is a pseudo range, the non-GNSS pseudo range, which is relative to a distance between the non-GNSS transmitter and one specific satellite, may be compared (214) to the pseudo range measured from the corresponding GNSS satellite. When the difference between those two pseudo ranges is above a threshold, the pseudo range measurement might suffer spoofing: a spoofing flag may be displayed to indicate that the PVT measurement might be erroneous, and/or specific actions intended, for example removing the corresponding GNSS pseudo range from the PVT computation 204 or replacing it by the pseudo range provided by the non-GNSS signal.

Advantageously, the comparison may be made by processing simultaneously or alternately pseudo ranges from various satellites of the GNSS constellation. To this end, the non-GNSS data link transmits simultaneously or alternately various pseudo ranges, along with an identifier of the considered satellite. This way, the validity of each of the GNSS pseudo ranges can be checked concomitantly or one after another.

The raw data considered for comparison may also be navigation messages, or specific fields of the navigation messages. The comparison may be limited to some specific fields, because some fields deliver transmission time, and cannot be compared easily. Among the various fields, the ephemeris field is of particular interest. Indeed, the ephemeris field is an easy way for an attacker to spoof a GNSS signal. In that case, the match between the GNSS and non-GNSS ephemeris shall be exact, otherwise a flag may be displayed and/or a specific action will be taken.

The embodiment of a receiver according to the invention presented in FIG. 2 differs from the one of FIG. 1 in that the comparison between the GNSS and non-GNSS information is not performed at the PVT level, but over raw data which are intermediate processing of the GNSS positioning. According to an alternate implementation, the receiver might use both time/spatial coordinates and raw data. To this end, the non-GNSS signal transmitted shall comprise alternately or simultaneously both raw data and positions.

According to one embodiment of a receiver according to the invention, the receiver according to the invention may be a terminal as represented in FIG. 1 or 2, comprising a processing device for receiving and processing both GNSS and non-GNSS signals, and the processing logic required to compare the two positioning pieces of information. This receiver might be for instance a smartphone, a tablet, a personal computer, an automobile (autonomous or not), or any Internet of Things (IoT) device equipped or not with a GNSS receiver.

Figure 3:
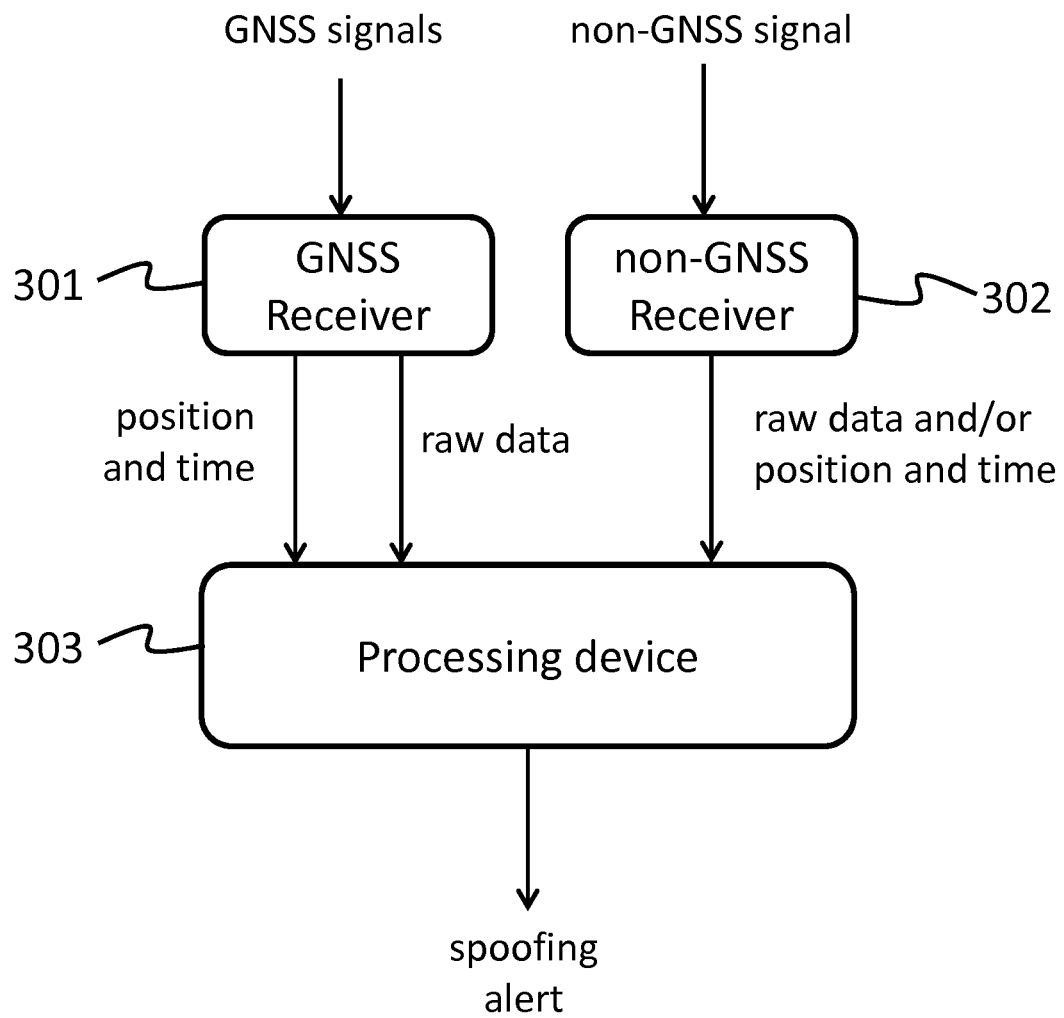
FIG. 3 represents an embodiment of a terminal according to the invention.

According to another embodiment, represented in FIG. 3, a receiver according to the invention is a terminal comprising both:
  a GNSS receiver 301, designed to receive GNSS signals, processing said signals, and providing raw data and/or a spatial and/or temporal coordinates, and
  a non-GNSS receiver 302, designed to receive a non-GNSS signal and to process said signal to retrieve the information contained, the information being raw data, spatial coordinates and/or time coordinates.

The terminal shall further comprise a processing logic 303, configured to compare the information carried by the GNSS and non-GNSS signals, and to determine whether or not the GNSS signals are prone to be spoofed.

This receiver might be for instance a device with some processing capabilities, for instance a smartphone or an onboard computer, connected to a GNSS receiver and/or non-GNSS signal acquisition equipment, or having dedicated chipsets. The processing logic may be embedded in a software application configured to display the result of the comparisons.

Nowadays, many equipment available on the market come equipped with chips dedicated to process GNSS signals and various RF communications standards. Most of the smartphones comprise means to communicate via 2G, 3G, 4G, Wi-Fi (IEEE 802.11) and Bluetooth™ standards, in addition to GNSS capabilities. It is also the case for many cars, cameras, drones, and other mass market equipment such as IoT devices. When not available, the computation chain required to implement the additional non-GNSS processing can be implemented in a receiver over a calculation machine such as a software reprogrammable calculation machine (microprocessor, microcontroller, digital signal processor (DSP), . . . ), a dedicated calculation machine (Field Programmable Gate Array (FPGA), Application Specific Integrated Circuit (ASIC), . . . ), or any other appropriate mean. The acquisition part of the additional chain may be implemented in hardware and/or software, depending on the platform considered to process the non-GNSS data link.

Concerning the technology used as non-GNSS data link, many possibilities are available. Advantageously, but not restrictively, this data link may be implemented in a technology that provides a short (but sufficient) range, in order to provide relevant positioning information about the receiver's position, and to further improve the complexity of an attack over the GNSS signal. Indeed, as an attack to spoof the GNSS signals used by a receiver according to the invention will be detected, the attacker has to spoof both the non-GNSS and GNSS transmissions to avoid such detection. This is why the second data link shall be different from the first data link, its independency guarantying the reliability of the two-factor validation of the positioning. Advantageously, limiting the range of the non-GNSS signal to short ranges limits the impact and potentialities of attacks. The range depends on type of application that is expected from the positioning measurement: for a GNSS receiver embedded in a car, the range expected from the second data link may be of tens or hundreds of meters, while for static uses (as for example authenticating a transaction) it may be in the order of a few meters. It also depends on the criticality of the positioning application. For instance, the range could be different for a same car when the car is moving and when the car is parking.

In an embodiment, the non-GNSS transmission used for transmitting positioning information to be compared with information measured from the GNSS signals is formed with machine-readable optical labels, like QR-codes™ (abbreviation for Quick Response codes). Such codes are two dimensional bar codes.

Using time-varying QR-codes as second data link implies at least the following advantages:
- displaying and capturing a QR-code only uses optical channels and there is no common mode with GNSS transmission. An attacker willing to spoof a positioning signal will have to spoof both the GNSS signals and the QR-code display, which increases the complexity and cost of the attack. In addition, the display of a QR-code is a local and directive way of transmitting information. To spoof this display, the attacker has to show up or find a way to display its own QR-code between the legitimate QR-code and the receiver, which limits the range of the spoofing to a restricted area;
- A GNSS receiver/camera pair is common in most mass market devices/equipments (including many different categories of devices such as smartphones, autonomous cars, . . . );
- The technology for implementing a camera into an equipment is mature, and camera chipsets can be found at a low cost;
- QR-codes are easy to display (LED billboards, screens, video projectors, e-ink-displays, . . . ) and can be placed anywhere;
- Display of QR-codes is a one-way link, which limits the possibility for an attacker to infiltrate and/or modify them;
- Opportunity displays are possible (for instance at the bottom corner of a screen), and usually no extra dedicated infrastructure may be required.

The QR-code may be modified periodically, in order to update the time information it contains, in particular when the spoofing detection is based on comparing time varying information, like ephemeris or a temporal position.

According to an embodiment of a transmitter according to the invention, the transmitter according to the invention does not send time-varying information: the data transmitted is limited to spatial positioning information. In this embodiment, the transmitter may be very limited, as for instance a display panel of any type.

According to an embodiment, where the information transmitted comprises a time-varying content, the transmitter is connected to a wired or wireless network in order to retrieve the relevant information, as for instance its position, a time information, and/or raw data. It is configured to generate a QR-code comprising this information, and to display the QR-code.

In another embodiment, the QR-code is computed over a remote server and transmitted through the network to the transmitter for display.

In another embodiment, the transmitter is standalone. Depending on the information transmitted within the QR-codes, it may comprise a clock that delivers temporal information, or may have spatial coordinates programmed into an internal memory. Advantageously, the transmitter according to the invention may comprise dedicated equipment or computational resources for receiving GNSS signals and determining the information that is transmitted through the QR-code, as for instance spatial or temporal positioning information (coordinates), an ephemeris, or any raw data. Indeed, the receiver being spoofed does not necessarily mean that the transmitter is also spoofed, as the transmitter is not at the same position than the receiver and may implement more robust spoofing mitigating algorithms or directive antennas. In that case, the advantage of such a transmitter is that it can operate autonomously, and can be moved to meet punctual anti-spoofing needs.

Into each of the previous embodiments of a transmitter according to the invention, the QR-codes used to transmit the positioning information may be encrypted, so that the robustness of the system against spoofing is further improved. They may also be transmitted along with an authentication key, so that the receiver only processes data sent by known and certified transmitters. Another way to improve the robustness may be to associate the authentication key with a predetermined coding, interleaving or encryption data format, which is applied to the transmitted positioning information.

When the non-GNSS and GNSS information to be compared have a limited lifetime, as for instance when the non-GNSS data transmitted contains temporal positioning information, or ephemeris, the rate at which the QR-codes must be updated does not necessarily have to be high, since the accuracy of the time information that is carried by the QR-code only has to be sufficient for a receiver to detect discrepancies between the GNSS and non-GNSS signals. This information is not used for positioning purposes, contrary to the information retrieved from the GNSS signals. Thus, for a time information, updating the QR-codes with a 1 Hz data rate for example shall be sufficient for non-critical applications. When the data transmitted over the QR-codes comprises ephemeris, the data update rate can be reduced to a few hours (typically as low as three or four hours). Higher refresh rate of the QR-codes may be considered, to transmit more information, as for example alternating transmission of raw-data (pseudo ranges) and positioning information (spatial and/or temporal), or in order to increase the accuracy of the time information. To some extent, a refresh rate of thirty or more frames per seconds can be considered, such a data rate being handled by most cameras for signal acquisition. Obviously, this data rate shall take into consideration the threshold embedded on the receivers for spoofing detection.

QR-codes can be sized in various formats, depending on the number of data bits to be carried. The choice shall be made according to the type of data to be transmitted. For example, a QR-code comprising both spatial and temporal information can be sized as follows:
- Latitude: from −90° to +90°, with a meter-level resolution, can be coded over 28 bits;
- Longitude: from −180° to +180°, with a meter-level resolution, can be coded over 29 bits;
- Altitude: from −1000 m to 10000 m, with a meter-level resolution, can be coded over 14 bits;
- Time: using unambiguous Week Number (WN) over 10 000 weeks (which covers about 190 years) and Time Of Week (TOW, ranging from 0 to 604800 sec) with a millisecond-level resolution, can be coded over 37 bits.

In this exemplary implementation, presented for illustration purposes only, 108 bits are necessary to transmit the position and time information. In that case, the information representative of a position and time can be implemented using version 1 with medium (M) error correction (128 bits) or version 2 with high (H) error correction (128 bits) QR-codes. The number of bits required may be increased in order to add cryptography, authentication keys, or additional signal processing algorithms such as error correcting codes or checksums, enhancing thus the robustness of the transmission.

In another exemplary implementation, a coarse position and time information is first transmitted in the QR-code, using a limited amount of bits. An offset to this coarse information is also transmitted in the QR-code, in order to refine this coarse position. This reduces the number of data bits to be carried. Other embodiments are possible, as for instance transmitting the coarse position without any encryption or additional correction (additional error correcting code, checksum, . . . ), and the offset to this position with encryption or additional correction, providing thus an additional protection within a limited amount of data bits.

When transmitting raw data, like pseudo ranges or ephemeris, the size of the QR-codes may be reduced, by transmitting only ephemeris concerning the position of a limited set of satellites, as for instance satellites in view of the transmitter, or by transmitting ephemeris concerning satellites selected randomly. Advantageously, ephemeris transmission can be limited to the transmission of a difference with regard to typical values, or to some variant of Hatanaka's compression techniques for RINEX (acronym for Receiver INdependent EXchange format) files.

QR-codes display can be performed using display panels (placed along roads or at specific points of interest), LCD displays or video projectors, the QR-codes being projected over buildings or over the road under the form of pictures or of a 50 or 60 Hz video. Transmission of positioning information comprising time varying information (temporal positioning information) increases the security as the time of life of the information displayed through the QR-codes is very limited. When they do not carry time-varying information, QR-codes may advantageously be displayed over static supports (billboards). Projection of QR-codes may be performed using invisible light, like for instance infrared light (700 to 1000 nm), in order to be as discreet as possible. In addition, the position of the projection can vary over time, in order to further complicate tasks for an attacker willing to spoof the non-GNSS signal by projecting with a high intensity false QR-codes over the legitimate QR-codes.

Acquisition (111) of QR-codes into a receiver according to one embodiment of the invention requires a two-dimensional digital image sensor, like a camera embedded in the receiver. The camera shall be adapted to the carrier frequency of the optical signal: for example, if the QR-codes are transmitted on an infrared light carrier, the camera shall be configured to acquire such signals. However, most of the photo sensors have the capability to operate in part of the infrared light. The receiver shall further comprise a calculation machine, dedicated chipset or application to process (112) QR-codes and retrieve the useful information that it contains. This processing comprises an error correcting decoding, that may for instance be a Reed Salomon decoding in the case of a QR-code. The format in which useful data is transmitted shall be known from the receiver.

According to another embodiment of the invention, the non-GNSS information is transmitted through an RF link, and preferably, through a short range RF link, so that the positioning information transmitted is relevant to the position of the receiver. The way the transmitter operates, and various implementation embodiments, is similar to the ones described for QR-codes transmitters, except that the transmission is made over an RF carrier instead of a light carrier.

Various types of short range RF communication standards may be used to implement the invention, including Bluetooth™, ZigBee™, Wi-Fi™, or RFID (acronym for Radio Frequency IDentification). The choice of the standard used to implement the data link mostly depends on the application. Advantageously, the RF signal can be broadcast to a limited area of interest, using a directive antenna.

The transmitter according to the invention using RF communication links may be standalone, or may retrieve the relevant information from a remote network, before modulating and transmitting it. The receiver according to the invention comprises at least an antenna and a RF reception chain, to acquire (111) and digitize the signal, and process it (112) in order to retrieve the relevant data.

According to another embodiment, the data link for transmitting the non-GNSS signal is an acoustic link, the receiver using a microphone to acquire the signal. This embodiment can easily be implemented in a smartphone, without interfering with other RF communications. In order to limit the audio pollution created by this transmission, the signal may use non-audible acoustic frequencies within the microphone's bandwidth. For instance, frequency bandwidth [18 kHz-22 kHz] is inaudible for most of the people, but belongs to the acquisition band of most of the microphones.

According to another embodiment, the data link for transmitting the non-GNSS signal is provided by an optical link, using VLC (Visible Light Communications). In this embodiment, acquisition (111) of the signal may be done using a light sensor. This embodiment is particularly advantageous as it has a short range, can easily be made directive, and uses visible and/or invisible light.

In order to be correctly interpreted, the positioning information transmitted through the non-GNSS data link must be encoded using a format that is known by the receivers.

According to one embodiment, the data format shall be programmed over each of the transmitter and receivers. However, this way to operate does not allow easy changes of the data format.

The invention may further use a server comprising an access to a database wherein each of the transmitters and receivers belonging to a network of equipments implementing the anti-spoofing method according to the invention are registered. The server is configured to send to the transmitters and receivers, through any kind of communication link (wired, RF, RFID, . . . ), the encoding format to be applied for the non-GNSS data transmission. This transmission may be effected during the first start of the equipments, or may be effected at various time intervals.

The encoding format may comprise a frame structure, including the various fields of the frame and the associated sizes, as well as parameters used for signal encoding, as for instance, depending on implementation choices, an error coding scheme, an interleaving scheme, and encryption key, etc. . . . . This way, the format in which the positioning information is transmitted can be modified at will by the server, without introducing incompatibilities issues of the various transmitters/receivers equipments.

In addition, the server may comprise a generator of authentication keys, and may be configured to propagate these authentication keys through the network of registered transmitters and receivers, so that each member of the network has an up to date list of the registered equipments. Each of the transmitters is associated to an authentication key. Advantageously, a specific coding/interleaving/encrypting scheme of the positioning information may be associated to each of the encryption key. For instance, the authentication key may be used as a seed for interleaving the positioning information transmitted. Thus, each transmitter uses its private encoding data format, the receivers being able to determine the appropriate data format to use for signal decoding from the authentication key associated to the positioning information.

The authentication key may in some embodiments be refreshed periodically, in order to preclude an attacker from performing meaconing.

Figure 4:
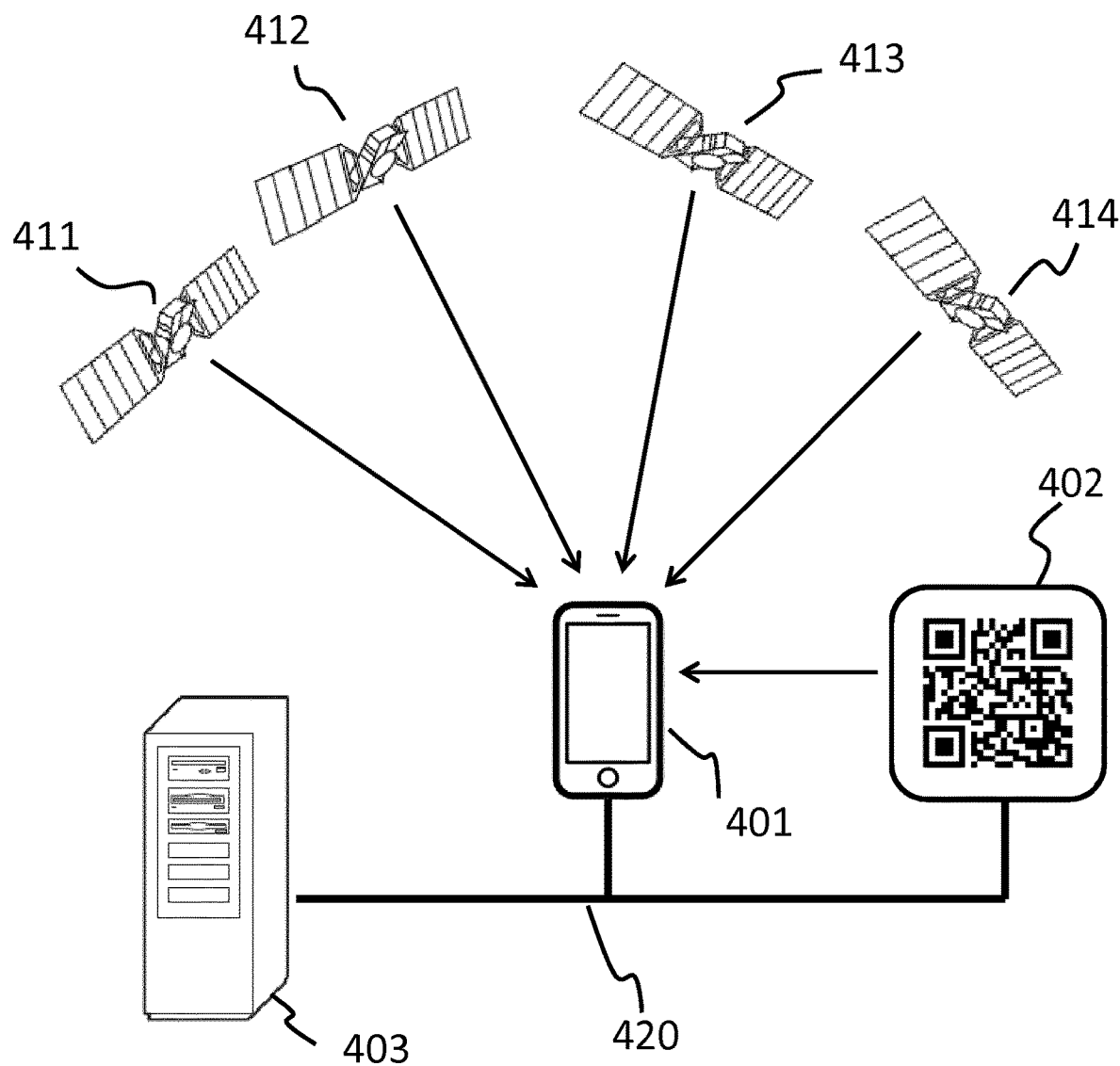
FIG. 4 represents a network according to an embodiment of the invention wherein the signals used to determine the position of the receiver are GNSS signals.

FIG. 4 illustrates a network according to the invention, comprising a terminal 401 configured to compute a PVT measurement from first GNSS signals transmitted by satellites 411, 412, 413 and 414. The GNSS signals could also have been transmitted through other means, as for instance GNSS repeaters or pseudolites. The network further comprises a transmitter 402 according to the invention, configured to transmit a second signal comprising a navigation message, an ephemeris, spatial or temporal coordinates, or a combination thereof. The transmitter 402 shall be different from the transmitter of the first signals. The second information must come from the outside of the receiving terminal 401, as use of internal data, as for instance the various internal sensors of a smartphone, to confirm the position computed do not prevent from software alteration of the data they provide. This second transmission must be an external data link, preferably provided by a data link that do not share a common mode with the first one (for instance, relying on two GNSS data links is less robust to spoofing than a GNSS link and a short range RF link). In FIG. 4, the second transmission is performed through the use of a QR-code, displayed for instance over a LCD billboard. Use of a non-RF data link a second data link, like for instance using optical signals or acoustical signal, is particularly advantageous as it is generally short range and directive, which improves the robustness to spoofing. Terminal 401 is configured to acquire the QR-code, retrieve the data transmitted, and compare this data with the GNSS data computed, in order to validate or not the GNSS PVT measurement.

In addition, the network may comprise a server 403, configured to transmit to the various transmitters and terminals of the network the format in which data are encoded in the QR-code. Data link 420 that connects the server to the various equipments can be any kind of wired or wireless link, as for instance an Ethernet network, a 3G or 4G network, a Wi-Fi network . . . . The server and the equipments do not have to be continuously connected: transmissions from the server can be performed just once at the first start of the equipments, at given moments of time, periodically, continuously . . . .

The server may comprise or may be linked to a database where the transmitters and terminals of the network are registered. An authentication key is assigned to each of the transmitters and communicated to the terminals. This authentication key is transmitted along with the positioning information within the QR-code, so that the receiver can approve or not the validity of the non-GNSS transmission. In an alternate embodiment, positioning information sent within the QR-codes is encrypted using an encryption key that relies on the authentication key of the transmitter. In another embodiment, the server may communicate to each transmitter and terminal of the network an encryption key to be used for non-GNSS transmissions.

Figure 5:
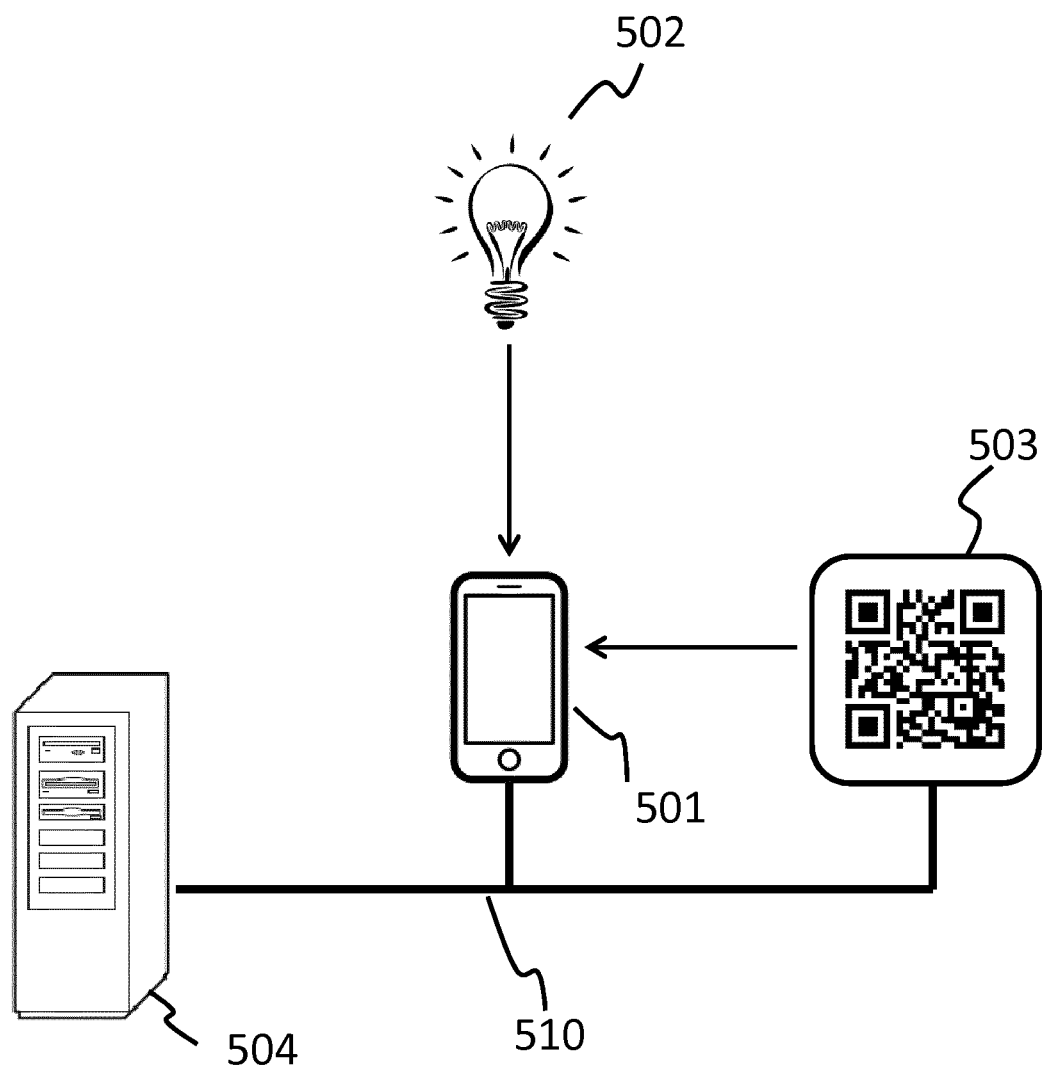
FIG. 5 represents a network according to another embodiment of the invention wherein the signals used to determine the position of the receiver may be delivered by beacons.

FIG. 5 describes an embodiment of another implementation example of a network according to the invention, wherein the positioning information is calculated from non-GNSS positioning signals, and the second transmission is made of a machine-readable optical label, as the display of a QR-code. The first and second implementation examples are not exclusive and can be mixed.

The various embodiments described in relation with the first implementation example of the invention (GNSS+any second data link delivering data to be compared with the GNSS processing) apply equally to this example, in particular considerations about size and data contained in the QR-code, accuracy of the information contained in the QR-code, and the authentication of the various equipments used to transmit said QR-code.

The implementation example of FIG. 5 is adapted to be deployed in indoor environment, as for example in a shopping mall or in a warehouse, where GNSS transmissions do not operate. In this embodiment, the first positioning information is acquired from a non-GNSS data link, as for instance by performing ranging over a plurality of Wi-Fi access points using a RSSI approach (acronym for Received Signal Strength Indication). In that case, the receiving chain is close to the one described in FIG. 1 for GNSS signals: at least three pseudo ranges between the receiver and various Wi-Fi access points are calculated from received signal power measurements, these pseudo ranges being used to compute a PVT measurement. According to another embodiment, represented in FIG. 5, the non-GNSS data link is provided by Bluetooth™, VLC or RFID beacons (or any other suitable communication mean) transmitting a position. In that case, the position transmitted is the position of the transmitter, but this position is considered by the receiver to be its own position, as the technologies employed are low-range technologies. The accuracy of the position determined is lower than the accuracy of an outdoor GNSS positioning measurement, but GNSS positioning cannot be deployed indoor. The value of the threshold set to compare the two position measurements must be chosen accordingly.

FIG. 5 represents such an embodiment of a system, wherein a terminal 501 receives a first position measurement from a VLC beacon 502 transmitting in visible or invisible light (or a RF data link provided by a Bluetooth™ equipment for instance), and a second positioning information from the display of a QR-code 503.

In addition, the equipment 503 displaying the QR-codes and the receiver 501 may be connected to a server 504, configured to transmit to the various transmitters and terminals of the network the format in which data are encoded by the QR-code. The server and QR-code transmitter are connected through a wired or wireless data link 510, as for instance an Ethernet network, a 3G or 4G network, a Wi-Fi network . . . . The server and the equipments do not have to be continuously connected: transmissions from the server can be performed just once at the first start of the equipments, at given moments of time, periodically, continuously . . . .

The server may comprise or may be connected to a database wherein the transmitters and terminals of the network are registered. An authentication key is assigned to each of the transmitters, and communicated to the terminals of the network. This authentication key is transmitted along with the positioning information within the QR-code, so that the receiver can approve or not the validity of the non-GNSS transmission. In an alternate embodiment, positioning information sent within the QR-codes are encrypted using an encryption key that needs to match the authentication key of the transmitter. In another embodiment, the server can communicate to each transmitter and terminal of the network an encryption key to be used with the machine-readable optical label.

Figure 6A:
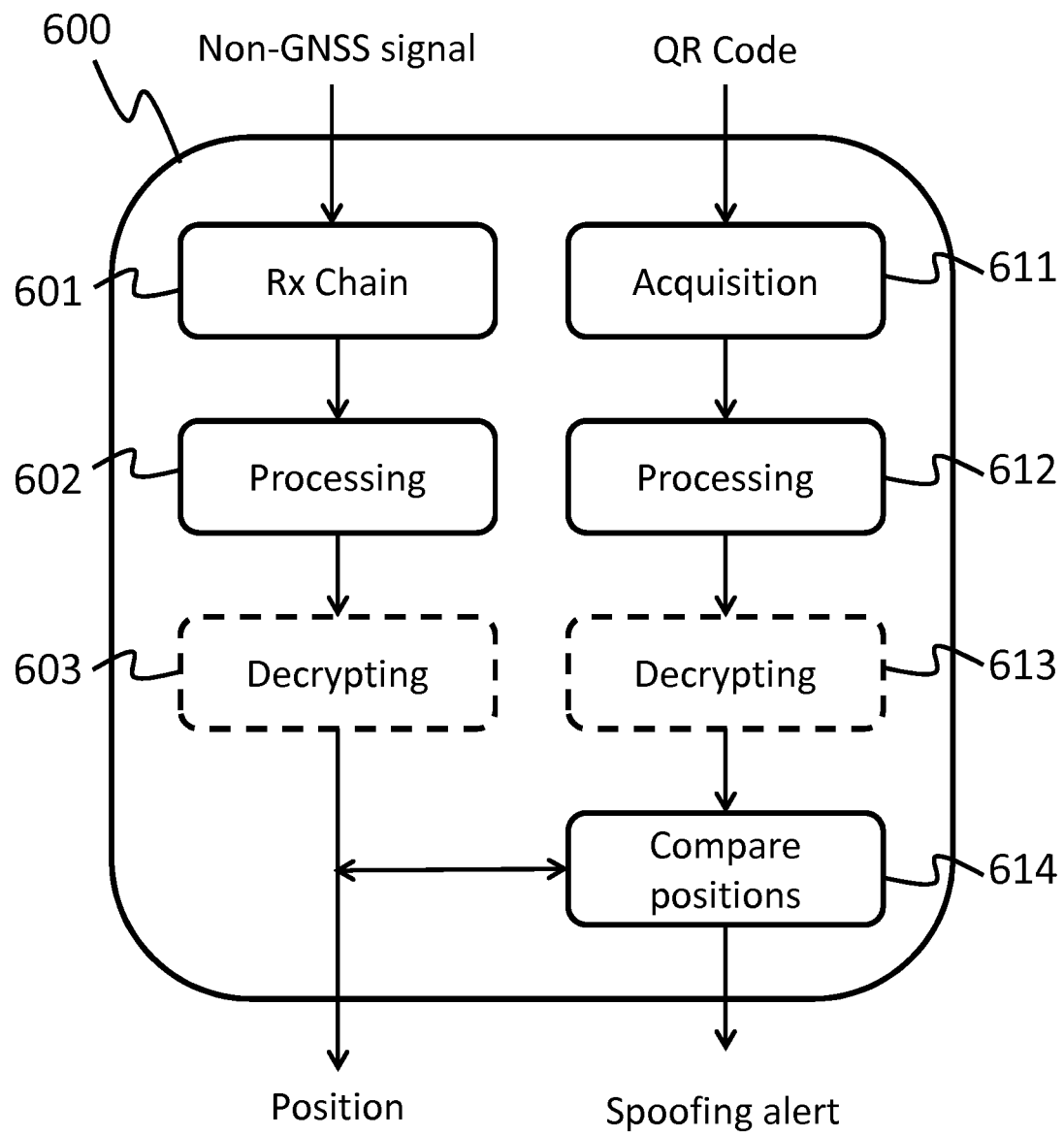
FIGS. 6a and 6b describe two embodiments of the invention wherein a positioning spoofing detection is performed through positioning information displayed as a QR-code.

FIG. 6a represents a terminal, as for instance a smartphone, according to an embodiment of the invention that corresponds to the second implementation example, wherein the second positioning information is directly provided by a data link.

The terminal 600 comprises a first receiving chain to receive (601) one or more non-GNSS signals, as for instance Wi-Fi, Bluetooth™ Visible Light Communications or RFID signals, perform the processing required to extract the useful data from the message (602), and perform optional deciphering processing (603) to recover the information carried by the signal about the position of the receiver, the position being either a temporal positioning or a spatial positioning or a combination thereof.

The terminal 600 further comprises a second receiving chain to acquire (611) a machine-readable optical label, perform the processing required to extract (612) the useful data from the optical label, and perform optional deciphering processings (613) to recover the information carried by the signal about the position of the receiver.

The receiver finally comprises some processing resources to compare both positioning pieces of information. When the difference between the two pieces of positioning information is above a threshold, the receiver takes the appropriate action, as for instance raising a flag or invalidating the positioning measurement.

Figure 6B:
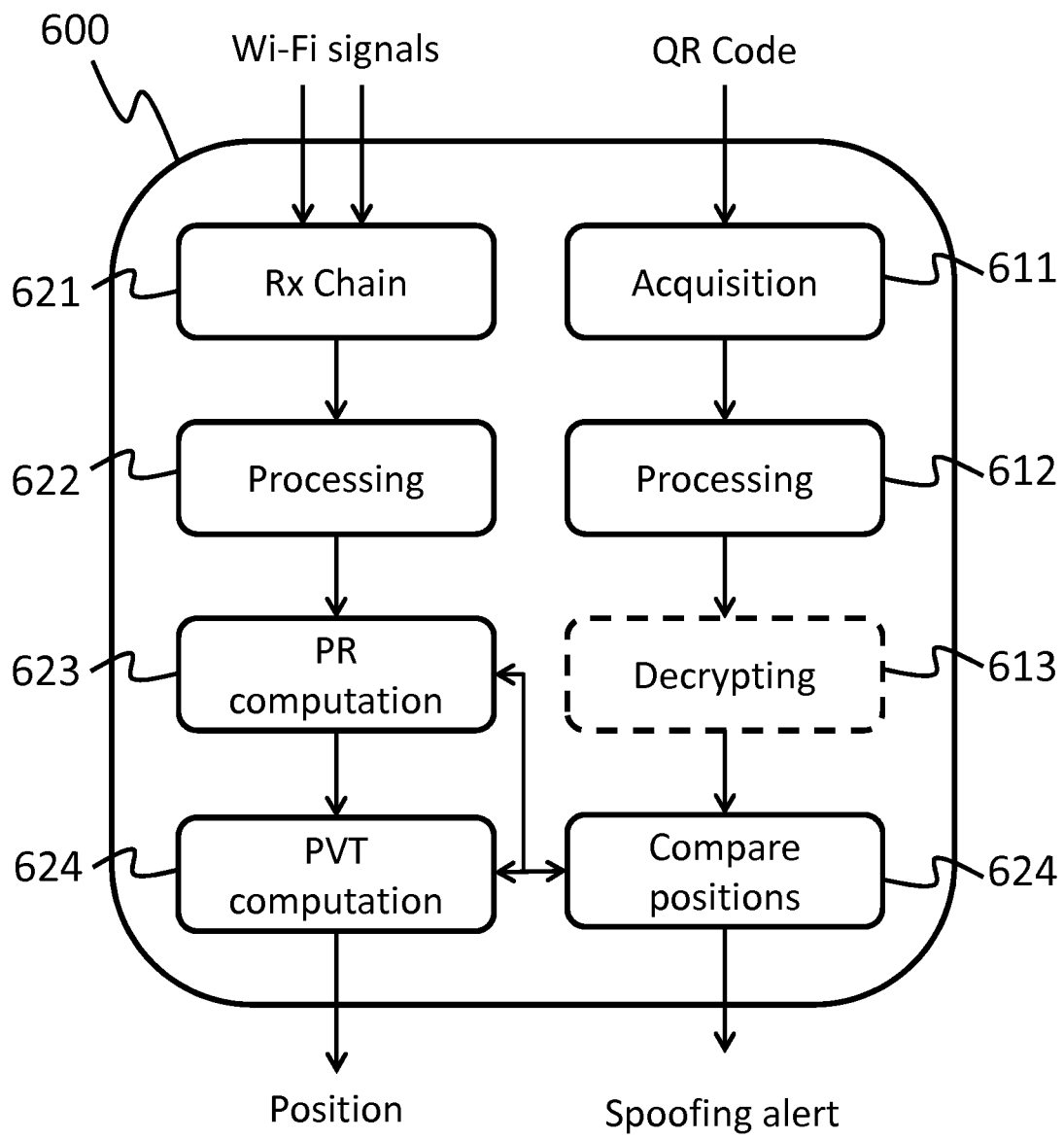

In another embodiment represented in FIG. 6b, the first positioning information is retrieved by triangulating Wi-Fi access points whose positions are known. The receiver comprises a Rx Chain 621 to receive and digitize Wi-Fi signals transmitted in various channels. The digitized signals are processed (622) simultaneously or alternately, as for instance to measure a received power level for each signal. From the known position of the access points and the measured power level, pseudo ranges calculations (623) are made, said pseudo ranges being used to determine a position by triangulation. In that case, the data compared (624) may be pseudo range measurements and/or position measurements, depending on the type of positioning information transmitted through the QR-codes (pseudo ranges or spatial positions).

The invention allows detecting spoofing by comparing positioning data transmitted through two distinct data links, the two data links using advantageously different propagation supports. The type of technology used to provide the positioning information is not as important as the fact of providing a two-factor validation of the position of a receiver, which increases the difficulty for an attacker to spoof both signals. For instance, one data link may use RF signals and the other one optical signals. The purpose of the second data link (as for example a machine-readable optical label) is not to increase the quality of the positioning, but to detect spoofing. However, the information transmitted through this data link may also be used for other purposes, as for example to fasten the signal acquisition of a GNSS receiver.

By comparing positioning data acquired from two different communication link, the receiver according to the invention can reliably detect spoofing, whatever the spoofed data link is, and may also provide an additional robustness to positioning errors due to difficult propagation conditions, or jamming.

Typical applications of the invention concern spoofing detection of GNSS positioning devices, notably when the sensitivity of the application is high, as for instance with autonomous vehicles, but also to improve the security of transactions. For instance, to validate a banking operation, a payment terminal may be equipped with a LCD screen to display QR-codes comprising information like time and spatial coordinates. When a smartphone is used for the payment, it flashes the QR-code displayed on the payment terminal. If its own position, acquired from GNSS signals or from RF beacons, does not match the position transmitted through the QR-code displayed on the payment terminal, at least one of the two positions is suspicious. The banking payment may be refused, or the bank informed. The invention may also be used to assert package deliveries: QR-codes transmitting local positioning information are positioned at places where packages are to be delivered. When the deliveryman reaches its destination, it flashes a QR-code which, when it matches the position delivered by the GPS receiver of the deliveryman, asserts that the package has been delivered at the expected place, reducing eliminating or mitigating the consequences if the position given by the GPS receiver has been hacked, either by a spoofing of the GPS signals or by software spoofing of the receiver.

Figure 7A:
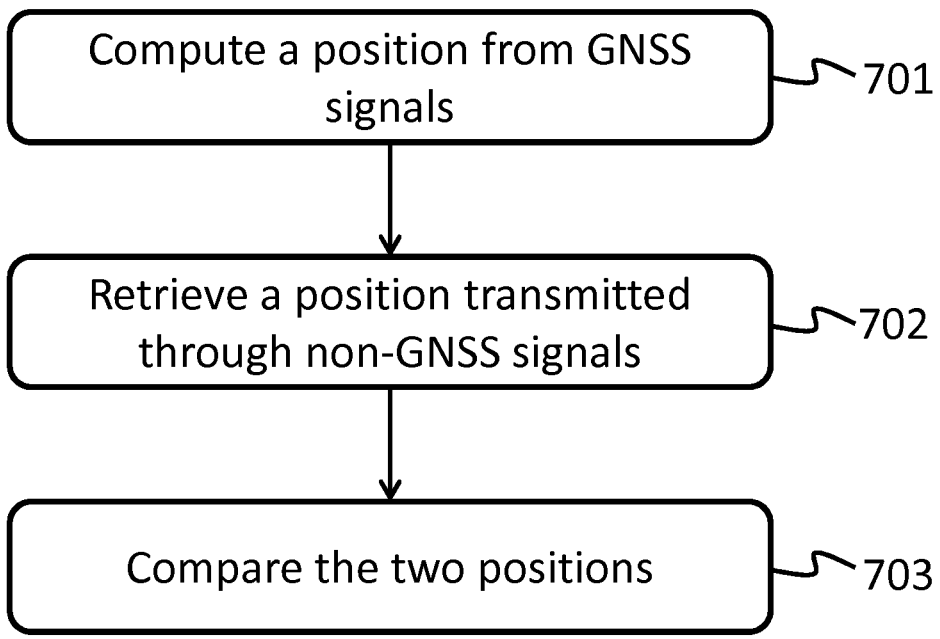
FIGS. 7a and 7b represent flow charts of methods to detect spoofing according to two embodiments of the invention.

The invention further concerns a method to calculate a position and detect spoofing in a terminal. This method applies to first signals used to compute a position, like for instance GNSS signals, and second signals, like for instance non-GNSS signals. FIG. 7a represents a flow chart of a first embodiment of the method. It comprises three main steps:

receiving GNSS signals (701) from GNSS sources, like satellites or ground-based station transmitting GNSS signals (GNSS repeaters or GNSS pseudolites), and processing said signals to calculate at least one first information relative to the position of the terminal. This first information is a positioning information that may be a pseudo range measurement, an ephemeris, a navigation message, spatial coordinates, temporal coordinates, or a combination thereof;

receiving a non-GNSS signal (702) from a second source, the second source being different from the GNSS sources and external to the receiver, as for instance Bluetooth™, Wi-Fi, RFID or VLC transmitters. The non-GNSS signal processed to retrieve one or more second information transmitted using a predetermined encoding format, the second information being of the same type as the first information;

comparing said first and second information to detect spoofing. When the comparison is above a threshold, the appropriate actions may be performed (raise a flag, deny position authentication, remove a specific pseudo range from a PVT calculation, etc. . . . ).

Figure 7B:
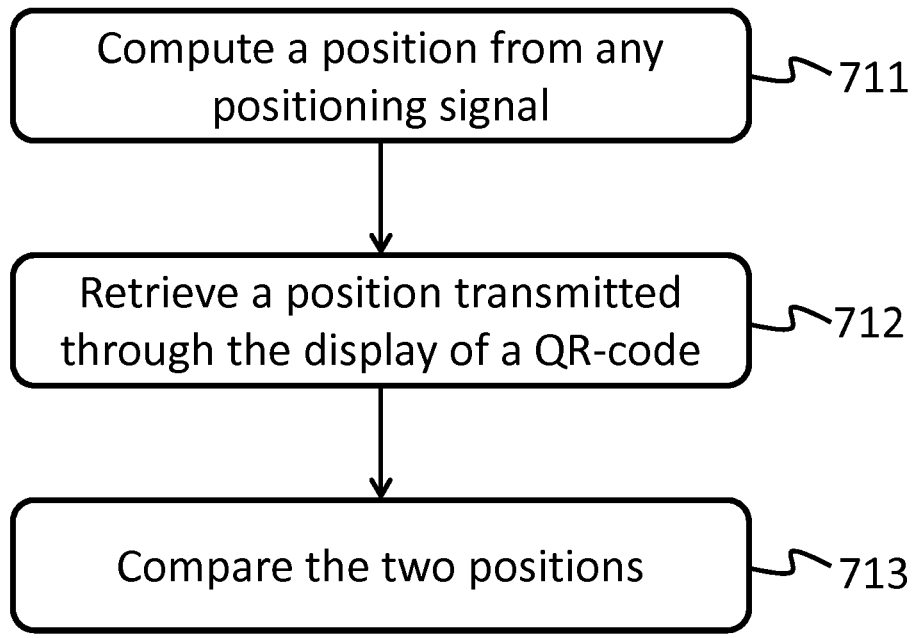

FIG. 7b represents a flow chart of another embodiment of the method, suitable in particular to indoor environments, where GNSS signals cannot be received. It comprises three main steps:

receiving one or more first signals (711) from first sources, as for instance Bluetooth™, Wi-Fi, RFID or VLC beacons, or Wi-Fi access points. The first signals are any type of signal that can be used to determine a position of the receiver. At least one first information is computed or extracted from said first signals, the information being relative to a position of the terminal. This first information may be a pseudo range measurement, spatial coordinates or temporal coordinates, or a combination thereof;

receiving a second signal (712) displayed as a machine-readable optical label, as for instance a QR-code, that comprises one or more second information transmitted using a predetermined encoding format. The second information is of a same type as said first information. The second information will be extracted from the second signal;

comparing said first and second information to detect spoofing. When the comparison is above a threshold, the appropriate actions may be performed (raise a flag, deny position authentication, remove some pseudo range from a PVT calculation, etc. . . . ).

Within each method, the first and second steps can be performed either simultaneously or alternately. The methods may further be supplemented by steps of authentication of the transmitters, in order to improve their robustness.

The invention is based on the use of a second communication channel, not necessarily RF, to transmit coarse positioning information that can be one or more of a pseudo-range value, an ephemeris, spatial coordinates or temporal coordinates. This information is to be compared with a primary positioning information computed from GNSS signals to assert the validity of a positioning estimate.

Depending on the embodiment, the invention can easily be implemented over already existing GNSS receivers or smartphones, and do not require high implementation costs to develop and deploy transmitters. The robustness to spoofing can be increased by introducing data encryption over the second data link, without modifying the primary data link, which is important in particular when the positioning is performed using GNSS systems, or to be integrated in already existing positioning networks.

Using a short range data transmission for the second data link, and, if possible, a directive one, makes the spoofing of this signal very complex to an attacker, and very short range. In addition, contrary to state of the art spoofing detection techniques, the spoofing detection method according to the invention is not sensitive to multipath reflections of the GNSS signals and to unexpected AGC variations. Thus, it is well suited to be used in urban or indoor environments, and is therefore complementary with other anti-spoofing algorithms.

While some embodiments of the invention have been illustrated by a description of various examples, and while these embodiments have been described in considerable details, it is not the intent of the applicant to restrict or in any way limit the scope of the appended claims to such details. The invention in its broader aspects is therefore not limited to the specific details, representative methods, and illustrative examples shown and described.

The invention claimed is:

1. A terminal to calculate a position and detect spoofing, comprising:
a first receiver configured to receive first signals from one or more first sources, and configured to compute one or more first information based on the one or more first signals, wherein:
the first information includes at least one of a pseudo range measurement, a satellite ephemeris, a satellite navigation message, spatial coordinates or temporal coordinates, and
the first receiver is configured to calculate a position of the terminal using the first information;
a second receiver configured to receive a second signal and a third signal, wherein:
the second signal is in the form of a machine-readable optical signal from a machine-readable optical label displayed by a second source outside the terminal,
the third signal provides an encoding format of the second signal,
the second signal comprises a second information of a same type as the first information,
the second receiver is configured to retrieve the second information employing the encoding format provided by the third signal; and
a processing logic configured to detect spoofing based on a comparison between the first information and the second information.

2. The terminal of claim 1, wherein the first signals are GNSS signals.

3. The terminal of claim 1, wherein the machine-readable optical label is a QR-code.

4. The terminal of claim 1, wherein spoofing is detected when a difference between the first information and the second information is above a threshold.

5. The terminal of claim 4, wherein the threshold is adaptive.

6. The terminal of claim 5, wherein the second signal further comprises an authentication key, the terminal being further configured to use the authentication key to retrieve the second information.

7. The terminal of claim 5, wherein the second signals are encrypted, the terminal being further configured to decrypt the second information.

8. The terminal of claim 5, wherein the second information is related to a position of an equipment from which the second signal is transmitted from.

9. A network comprising:
a set pf terminals of claim 5; and
a transmitter, for transmitting the second signal carrying the second information, wherein the second information is one or more of a pseudo range measurement, a satellite ephemeris, a satellite navigation message, spatial coordinates of the transmitter, or temporal coordinates, wherein the second information is transmitted in the encoding format made available to the set of terminals and is adapted to be compared to another positioning information by a terminal in the set of terminals.

10. The network of claim 9, wherein the transmitter transmits the second information through a display of the machine-readable optical label.

11. The network of claim 9, wherein the second information transmitted by the transmitter is time varying.

12. The network of claim 9, wherein the transmitter is associated to an authentication key, and is further configured to transmit the second information using a key encoding format relying on the authentication key.

13. The network of claim 9, wherein the transmitter is further configured to encrypt the second information.

14. The network of claim 9 further comprising:
a database in communication with a server;
multiple transmitters registered in the database; and
multiple terminals registered in the database, wherein:
the server is configured to transmit to the transmitters and the terminals registered in the database one or more encoding formats to be applied to the second information transmitted from the transmitters to the terminals.

15. The network of claim 14, wherein the server is further configured to generate authentication keys associated to the transmitters registered in the database.

16. A method of calculating a position and detecting spoofing in a terminal, comprising the steps of:
receiving one or more first signals from one or more first sources;
computing one or more first information based on the one or more first signals, wherein the first information is one or more of a pseudo range measurement, a satellite ephemeris, a satellite navigation message, spatial coordinates or temporal coordinates;

calculating a position of the terminal using the first information;

receiving a second signal in the form of a machine-readable optical signal from a machine-readable optical label displayed by a second source outside the terminal, the second signal comprising one or more second information of a same type as the first information;

receiving a third signal providing an encoding format of the second signal;

retrieving the second information using the encoding format; and detecting spoofing by comparing the first information and the second information.

17. The terminal of claim 5, wherein the first signal comprises the satellite ephemeris.

\* \* \* \* \*